No. 873,376. PATENTED DEC. 10, 1907.
J. S. KENDIG.
WHEELED CULTIVATOR.
APPLICATION FILED DEC. 15, 1905.
2 SHEETS—SHEET 1.
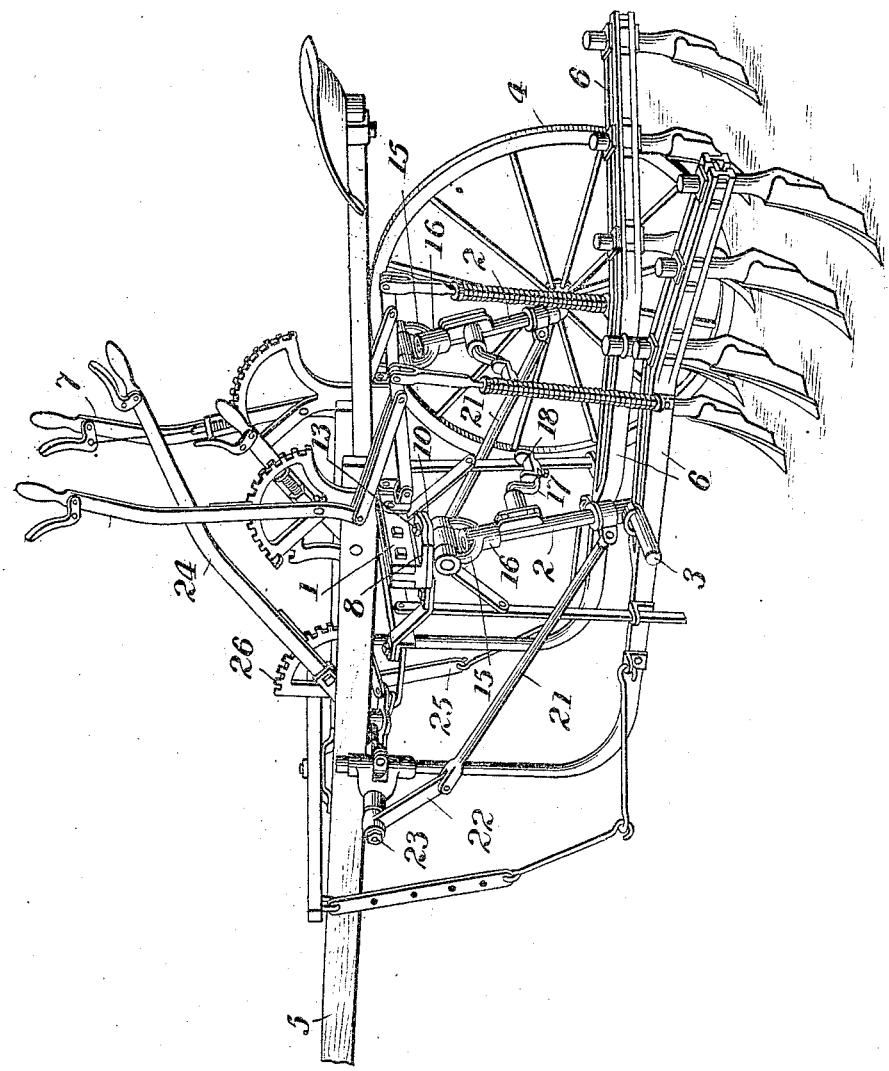
Witnesses
Inventor
Jacob S. Kendig
by Foster Freeman & Watson
Attorneys

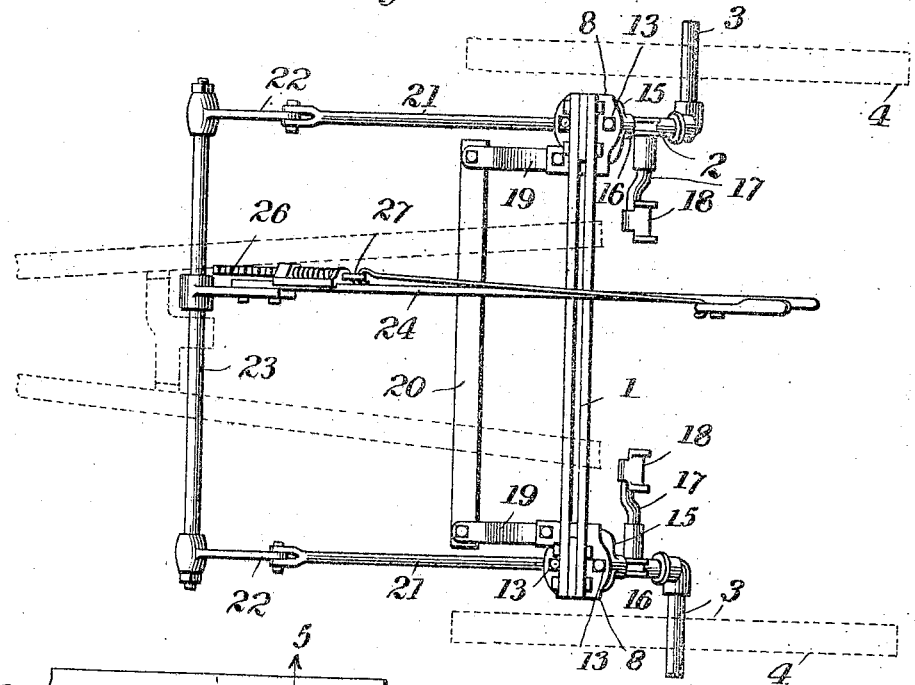
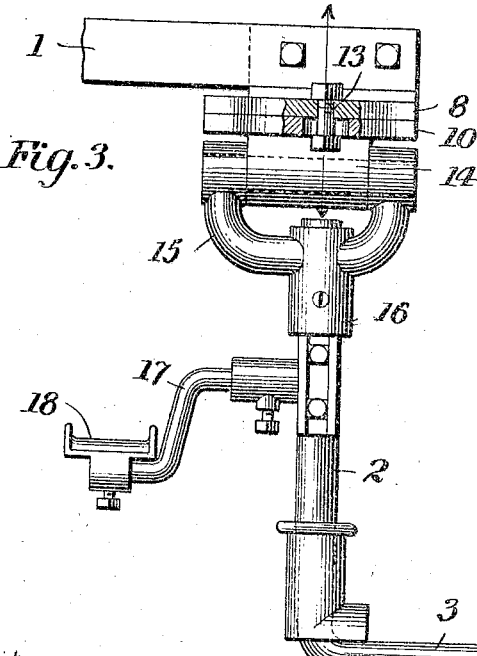
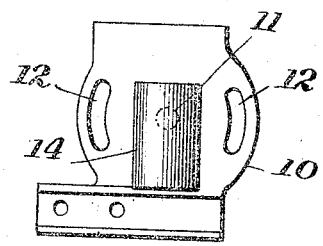
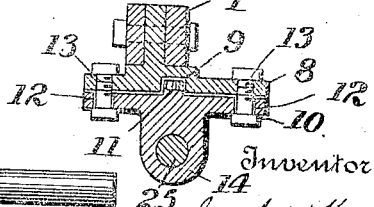

UNITED STATES PATENT OFFICE.

JACOB S. KENDIG, OF YORK, PENNSYLVANIA, ASSIGNOR TO KEYSTONE FARM MACHINE COMPANY, OF YORK, PENNSYLVANIA, A CORPORATION OF PENNSYLVANIA.

WHEELED CULTIVATOR.

No. 873,376.　　　　Specification of Letters Patent.　　　Patented Dec. 10, 1907.

Application filed December 15, 1905. Serial No. 291,893.

*To all whom it may concern:*

Be it known that I, JACOB S. KENDIG, a citizen of the United States, and resident of York, York county, and State of Pennsylvania, have invented certain new and useful Improvements in Wheeled Cultivators, of which the following is a specification.

This invention comprises improvements in wheeled cultivators which permit of balancing the cultivator upon its wheels and at the same time guiding the wheels by foot or hand power in the usual manner, in other words, the invention comprises a balanced pivot-axle cultivator.

In the accompanying drawings, Figure 1 is a perspective view of a wheeled cultivator embodying the present invention, a portion of the frame being broken away and one of the wheels removed; Fig. 2 is a plan view illustrating the steering and balancing devices; Fig. 3 is an enlarged rear view of one of the axles, showing its connection with the main beam or arch; Fig. 4 is a bottom plan view of a part of the universal joint connecting the axle with the beam; and Fig. 5 is a section on the line 5 of Figs. 3 and 4.

Referring to the drawings, 1 indicates the main beam which is supported on arms 2 carrying the short axles 3 upon which the supporting wheels 4 are journaled. The various parts of the cultivator are supported either from the beam 1 or from the frame 5 which, together with the beam, constitute the main frame of the machine. 6 indicates the gangs of plows which may be of any suitable construction and connected to the frame in any suitable manner. As shown, they are adapted to be raised and lowered by handles 7.

The arms 2 are so connected with the transverse beam 1 that they may be swung backward and forward to balance the cultivator upon its wheels and also turned about their axes for the purpose of steering the wheels. To permit of these movements the arms 2 are connected with the beam 1 by universal joints, which as shown are constructed as follows: Rigidly connected at each end of the beam 1 is a plate 8 which is preferably provided with a central socket 9. Beneath the plate 8 is a corresponding plate 10 having a central stud or projection 11 adapted to turn in the socket 9. The plate 10 is provided with curved slots 12 which are concentric with the pivot 11 and the plates are rotatably connected by means of bolts or pins 13 passing loosely through the slots 12. On the underside of the plate 10 is a projecting hub 14 to which is pivotally connected a bracket 15 having a sleeve 16 which receives the arm 2 carrying the axle 3. Suitably connected to each of the arms 2 is the usual steering lever 17 having a foot rest 18.

As shown in Figs. 1 and 2, the plates 10 are provided with forwardly projecting arms 19 which are connected by a link 20. As the plates 10 and the arms 19 turn with the axles 3, it will be evident that the wheels will always be maintained parallel by the link 20.

To provide for balancing the cultivator upon its wheels the arms 2 are connected by means of links 21 with arms 22 fixed upon a rock shaft 23. The rock shaft is provided with a hand lever 24 by means of which the wheel arms 2 may be rocked about their pivots 25 and the arms 2 may be locked in any desired position by means of a toothed segment 26 and a bolt 27 which is mounted on the hand lever 24.

It will be seen that my invention includes, in combination, means for steering the wheels of a cultivator and means for moving the wheels backward and forward relatively to the frame to balance the cultivator. This combination I claim broadly as my invention without limiting myself to the particular details of construction illustrated and described.

What I claim and desire to secure by Letters Patent is,

1. In a wheeled cultivator, the combination with the frame, of two independent axles, supporting wheels mounted on said axles, means for turning said axles to steer the cultivator, and means for shifting the axles relatively to the frame to balance the cultivator.

2. In a wheeled cultivator, the combination with the transverse supporting beam, of a pair of axle supporting arms each connected with said beam by joints permitting said arms to turn for steering and to rock forward and rearward to balance the cultivator.

3. In a wheeled cultivator, the combination with the transverse supporting beam, of a pair of axle supporting arms connected with said beam by suitable joints, means for turning said axles to steer the cultivator, and means for moving said axles forward and rearward relative to the beam to balance the cultivator.

4. In a wheeled cultivator, the combination with the frame including a transverse beam, axle arms connected to the beam by suitable joints and extending downward therefrom, means for turning said arms to steer the cultivator, connections between said arms whereby they turn simultaneously, a rock shaft, means for turning said rock shaft and locking it in different positions, and connections between said rock shaft and the axle arms whereby the latter are made to swing forward or rearward to balance the cultivator.

5. In a wheeled cultivator, the combination with the frame, including a transverse beam, of plates 8 connected with said beam, plates 10 pivotally connected with said plates 8, axle arms 2 pivotally connected with the plates 10, means for turning said axle arms to steer the cultivator, and means for swinging said axle arms to balance the cultivator.

6. A two-wheeled cultivator having a frame, independently pivoted steering axles, and means for balancing the frame on said axles.

7. A two-wheeled cultivator having a frame, and independently pivoted steering axles, means for swinging said axles forward and rearward to balance the frame on the axles, and means for locking the axles at any desired point of said forward and rearward movement.

8. A two-wheeled cultivator having a frame, axle arms hinged to said frame to swing forwardly and rearwardly whereby the frame may be balanced, and steering axles pivotally connected to said arms.

In testimony whereof I affix my signature in presence of two witnesses.

JACOB S. KENDIG.

Witnesses:
 IRENE STICKEL,
 ANNA BAUGHMAN.